(12) United States Patent
Pang et al.

(10) Patent No.: US 11,460,401 B2
(45) Date of Patent: Oct. 4, 2022

(54) METHOD OF FABRICATING AN ARRAY OF PLASMONIC STRUCTURES, A BIOSENSOR AND A METHOD OF FABRICATING A BIOSENSOR

(71) Applicant: City University of Hong Kong, Kowloon (HK)

(72) Inventors: Stella W Pang, Kowloon (HK); Shuyan Zhu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 379 days.

(21) Appl. No.: 16/878,936

(22) Filed: May 20, 2020

(65) Prior Publication Data

US 2021/0364431 A1 Nov. 25, 2021

(51) Int. Cl.
*G01N 21/552* (2014.01)
*G02B 5/00* (2006.01)
*G01N 21/65* (2006.01)
*G02B 6/122* (2006.01)

(52) U.S. Cl.
CPC ......... *G01N 21/553* (2013.01); *G01N 21/658* (2013.01); *G02B 5/008* (2013.01); *G02B 6/1226* (2013.01); *G02B 2207/101* (2013.01)

(58) Field of Classification Search
CPC .... G01N 21/553; G01N 21/658; G02B 5/008; G02B 6/1226; G02B 2207/101
See application file for complete search history.

(56) References Cited

U.S. PATENT DOCUMENTS

| | | | |
|---|---|---|---|
| 10,725,373 B1* | 7/2020 | Kumar | G02B 1/02 |
| 2008/0212102 A1* | 9/2008 | Nuzzo | G01N 21/554 |
| | | | 359/321 |
| 2010/0067016 A1* | 3/2010 | Ueno | G01J 5/02 |
| | | | 977/773 |
| 2011/0166045 A1* | 7/2011 | Dhawan | H01L 29/068 |
| | | | 257/467 |
| 2012/0273662 A1* | 11/2012 | Caldwell | G01N 21/658 |
| | | | 250/214.1 |
| 2015/0153283 A1* | 6/2015 | Huang | G01N 33/54386 |
| | | | 506/13 |
| 2016/0320300 A1* | 11/2016 | Kasemo | G01N 21/554 |
| 2021/0164840 A1* | 6/2021 | Mikkelsen | G01J 5/34 |
| 2022/0155150 A1* | 5/2022 | Tapp | H01L 27/14625 |

* cited by examiner

*Primary Examiner* — Marcus H Taningco
(74) *Attorney, Agent, or Firm* — Renner Kenner Greive Bobak Taylor & Weber

(57) ABSTRACT

A method of fabricating an array of plasmonic structures, a biosensor and a method of fabricating the biosensor. The biosensor includes: an array of plasmonic structures arranged on a base, and defining a detection surface distanced from the base; a separator arranged to separate at least a main portion of a cell from the detection surface; wherein the biosensor is arranged to detect, based on a change of an optical property of the array of plasmonic structures, in response to one or more protrusions extending from the main portion of the cell reaching the detection surface.

38 Claims, 13 Drawing Sheets

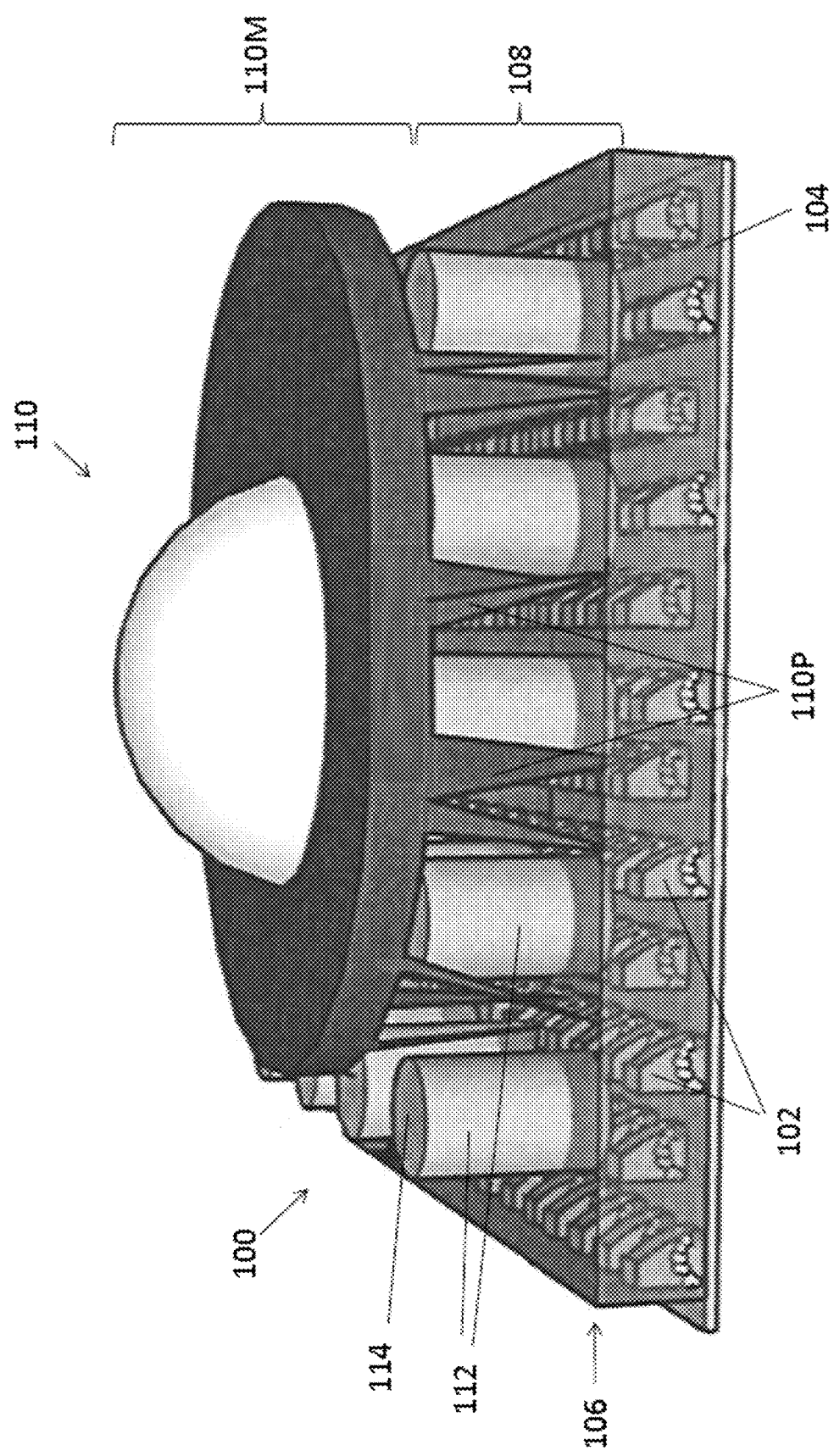

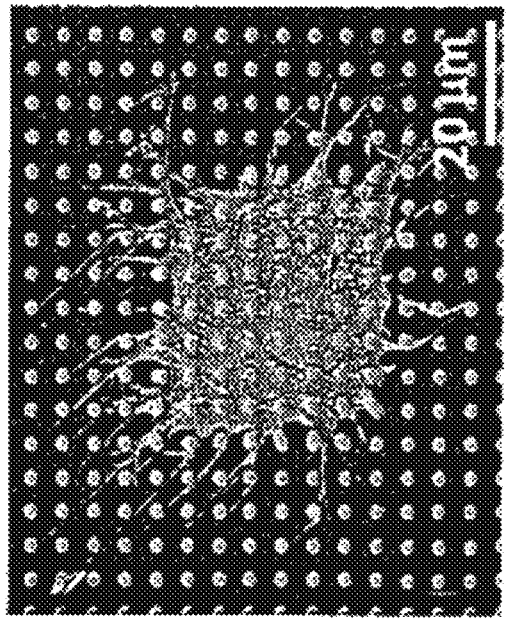
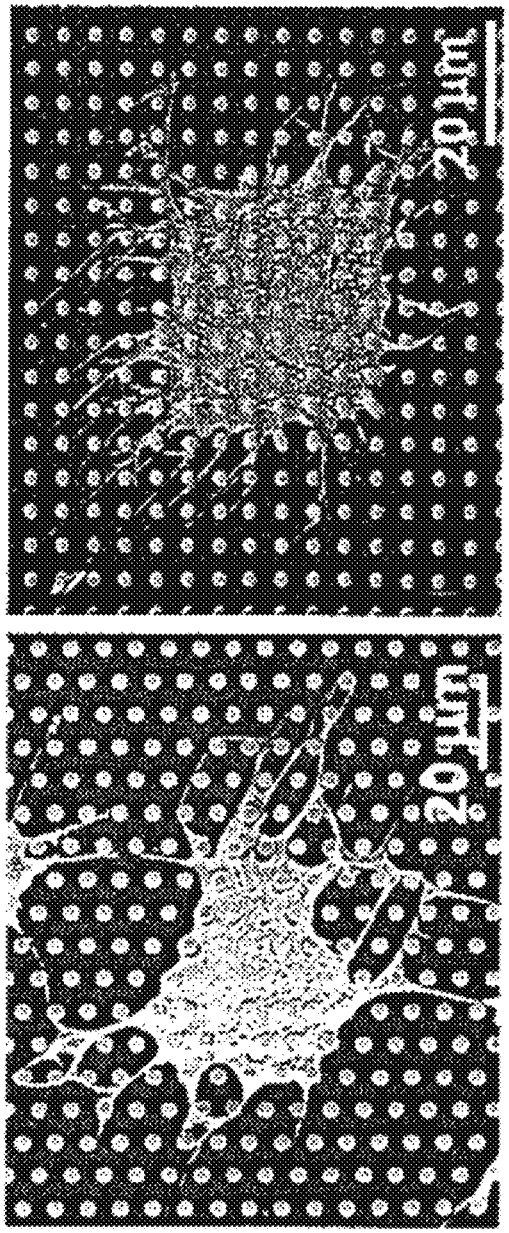
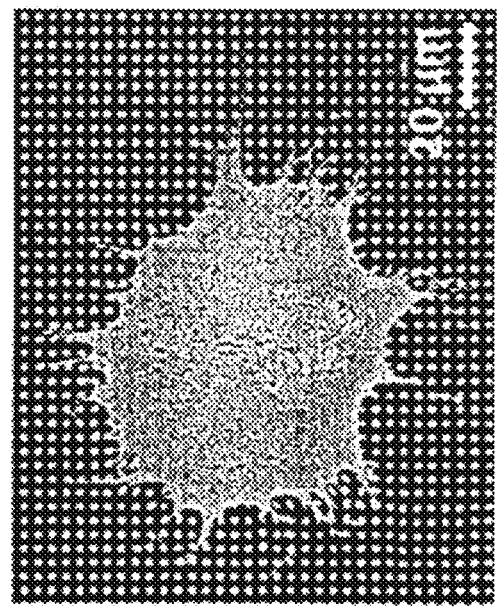
FIG. 7A
3.2 μm Dia., 4.7 μm Gap
FIG. 7B
2.2 μm Dia., 3.2 μm Gap
FIG. 7C
2 μm Dia., 2 μm Gap

METHOD OF FABRICATING AN ARRAY OF PLASMONIC STRUCTURES, A BIOSENSOR AND A METHOD OF FABRICATING A BIOSENSOR

TECHNICAL FIELD

The present invention relates to a fluidic apparatus for detection of a method of fabricating an array of plasmonic structures, a biosensor and a method of fabricating the biosensor, although not exclusively, to a plasmonic biosensor for cancer diagnosis.

BACKGROUND

A disease is any condition that impairs the normal functioning of the body, which can be generally divided into infectious and non-infectious. Importantly, any improper or delay treatment of a disease could lead to a fatal consequence to a patient, regardless of what type of the disease is. Thus, the screening and diagnosis of the disease is of paramount importance.

Traditional screening methods usually include invasive procedures during sampling process. The screening methods are also time-consuming and require tedious instruments installed in laboratories for carrying out the measurements. Although the results generated therefrom may be very accurate and sensitive, such methods may not be suitable for daily applications which require point-of-care and low-cost setup.

SUMMARY OF THE INVENTION

In accordance with a first aspect of the present invention, there is provided a biosensor, comprising: an array of plasmonic structures arranged on a base, and defining a detection surface distanced from the base; and a separator arranged to separate at least a main portion of a cell from the detection surface; wherein the biosensor is arranged to detect, based on a change of an optical property of the array of plasmonic structures, in response to one or more protrusions extending from the main portion of the cell reaching the detection surface.

In an embodiment of the first aspect, the protrusions include filopodia extending from the main portion of the cell.

In an embodiment of the first aspect, each of the plasmonic structures includes an asymmetrical pillar structure formed on the base.

In an embodiment of the first aspect, the asymmetrical pillar structure includes a sloped sidewall.

In an embodiment of the first aspect, the biosensor further comprises a layer of metal covering the top and part of the sloped sidewall of the asymmetrical pillar structures and the base.

In an embodiment of the first aspect, the layer of metal includes gold and/or chromium.

In an embodiment of the first aspect, the detection surface is above a plane defined by the top of the array of plasmonic structures.

In an embodiment of the first aspect, the detection surface is at 0-100 nm above the top of the array of plasmonic structures.

In an embodiment of the first aspect, the array of plasmonic structures includes a feature size smaller than or equals to 1000 nm.

In an embodiment of the first aspect, the separator comprises an array of posts adjacent to the array of plasmonic structures.

In an embodiment of the first aspect, the array of posts includes a feature size larger than or equals to 2000 nm.

In an embodiment of the first aspect, the array of posts defines a top surface separated from the detection surface with a distance approximated to a depth of the posts.

In an embodiment of the first aspect, the top surface of the posts is arranged to facilitate the main portion of the cell to rest thereon, and the protrusions extending from the main portion of the cell to reach the detection surface through the gaps defined by the array of posts.

In an embodiment of the first aspect, the separator further comprises a cell adhesion coating covering at least a portion of each of the posts.

In an embodiment of the first aspect, only the top of each of the posts is coated with the cell adhesion coating to facilitate the binding of the main portion of the cell on the top surface.

In an embodiment of the first aspect, the cell adhesion coating includes fibronectin or collagen.

In an embodiment of the first aspect, the array of plasmonic structures and the separator includes SU-8, PDMS, polyimide, or PMMA polymer.

In an embodiment of the first aspect, the optical property includes a refractive index of the array of plasmonic structures altered by the protrusions of the cell reaching the detection surface.

In an embodiment of the first aspect, the biosensor is arranged to determine a density of filopodia of a cell in cancer diagnostics.

In accordance with a second aspect of the present invention, there is provided a method of fabricating an array of plasmonic structures, comprising the steps of: fabricating a first array of pillar structure on a stamp substrate; transferring the profile of the first array of pillar structure to an intermediate stamp; and a second array of pillar structures substantially replicating the profile of the first array of pillar structure on a final substrate using the intermediate stamp; wherein each of the pillar structures in the first array of pillar structure and the second array of pillar structure includes an asymmetrical pillar structure.

In an embodiment of the second aspect, the asymmetrical pillar structure includes a sloped sidewall.

In an embodiment of the second aspect, the step of fabricating the first array of pillar structure on the stamp substrate comprises the steps of: providing an etch mask including an array of etch masking pillar structures on the stamp substrate; etching the stamp substrate to form the first array of pillar structure each defined with a sloped sidewall.

In an embodiment of the second aspect, each of the etch masking pillar structures includes an inclination with respect to a surface of the stamp substrate.

In an embodiment of the second aspect, the step of providing an etch mask on the stamp substrate comprises the steps of: imprinting the array of etch masking pillar structures on the stamp substrate; and imprinting, demolding at an angle to define the etch masking pillar structures with the inclination.

In an embodiment of the second aspect, the etch masking pillar structures include SU-8, PDMS, polyimide, or PMMA polymer.

In an embodiment of the second aspect, the stamp substrate is a silicon substrate and is etched using a dry etching.

In an embodiment of the second aspect, the intermediate stamp includes an intermediate polymer stamp.

In an embodiment of the second aspect, the step of forming a second array of pillar structures on the final substrate comprises the step of imprinting the second array of pillar structures on the final substrate.

In an embodiment of the second aspect, the second array of pillar structures includes SU-8, PDMS, polyimide, or PMMA polymer.

In an embodiment of the second aspect, the method further comprises the step of reducing a surface energy of the stamp substrate prior to the step of transferring the profile of the first array of pillar structure to an intermediate stamp.

In an embodiment of the second aspect, the surface energy is reduced by treating the stamp substrate with trichloro(1H, 1H, 2H, 2H-perfluorooctyl)silane, 3-methacryloxypropyl trichlorosilane or mixture of silanes.

In accordance with a third aspect of the present invention, there is provided a method of fabricating a biosensor, comprising the steps of: providing an array of plasmonic structures formed on a base using the method in accordance with the second aspect, wherein the array of plasmonic structures defines a detection surface distanced from the base; providing a separator arranged to separate at least a main portion of a cell from the detection surface; wherein the biosensor is arranged to detect, based on a change of an optical property of the array of plasmonic structures, in response to one or more protrusions extending from the main portion of the cell reaching the detection surface.

In an embodiment of the third aspect, the method further comprises the step of depositing a layer of metal covering the top and part of the sloped sidewall of the asymmetrical pillar structures and the base.

In an embodiment of the third aspect, the layer of metal includes gold and/or chromium.

In an embodiment of the third aspect, the step of providing the separator comprises the step of depositing and patterning a layer of polymer to form an array of posts adjacent to the array of plasmonic structures.

In an embodiment of the third aspect, patterning a layer of polymer includes patterning a layer of SU-8, PDMS, polyimide, or PMMA using optical lithography.

In an embodiment of the third aspect, the step of providing the separator further comprises the step of coating at least a portion of the posts with cell adhesion coating to facilitate the binding of the main portion of the cell on the top surface.

In an embodiment of the third aspect, the cell adhesion coating includes fibronectin or collagen.

BRIEF DESCRIPTION OF THE DRAWINGS

Embodiments of the present invention will now be described, by way of example, with reference to the accompanying drawings in which:

FIG. 1 is a perspective view of a biosensor in contact with a cell in accordance with an embodiment of the present invention;

FIGS. 7A to 7C are micrographs showing MC3T3 cells on 5 μm deep microposts with different diameters and sizes of gap;

DETAILED DESCRIPTION OF THE PREFERRED EMBODIMENT

Figure 2A:
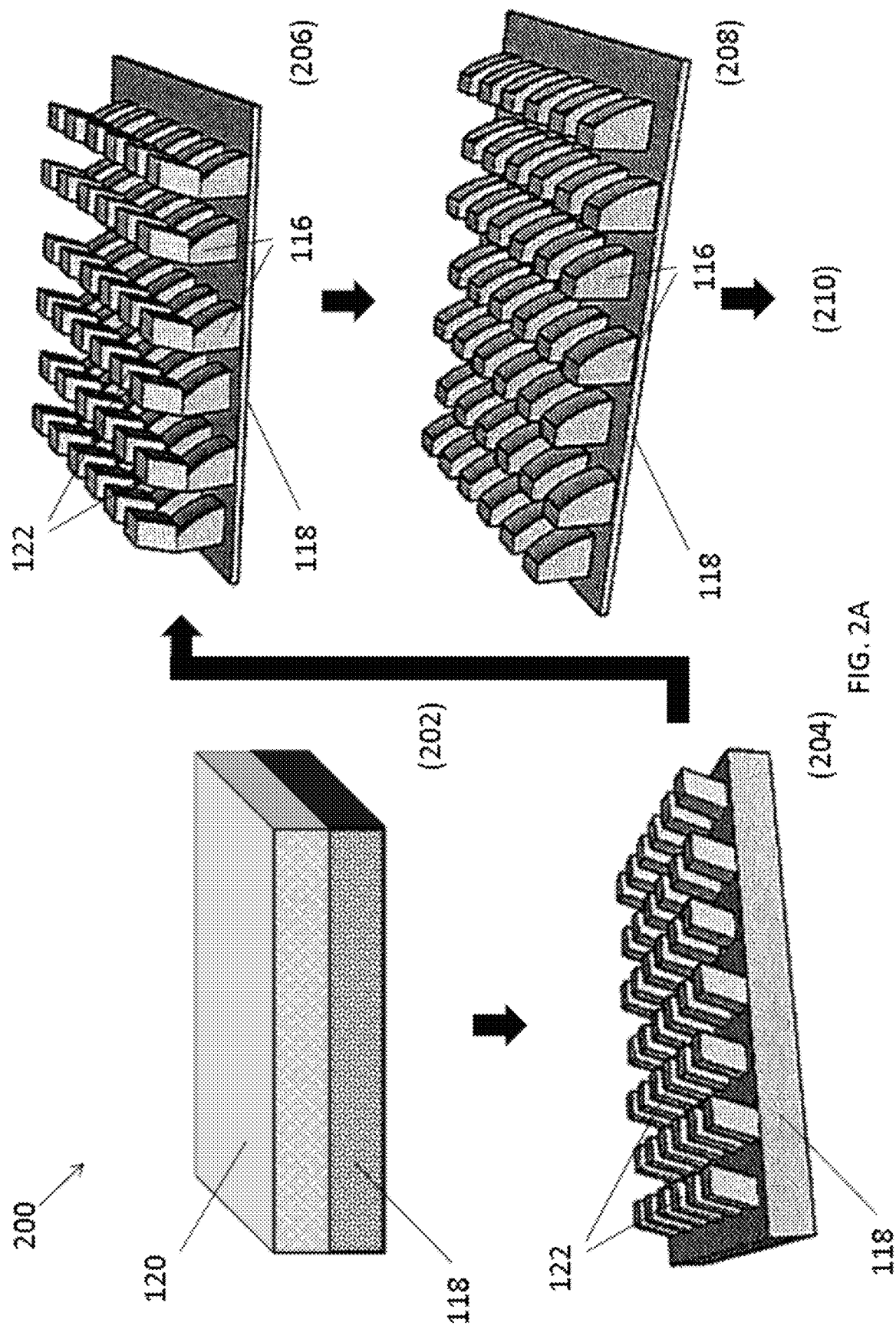
FIGS. 2A to 2C are process flow diagram shown example fabrication process for producing respectively a silicon stamp, an array of plasmonic structures on a silicon substrate and the biosensor of FIG. 1.

The inventors have, through their own research, trials and experiments, devised that in cancer diagnostics applications, detection of filopodia may be used to identify cancer since cancer cells demonstrate higher density of filopodia than normal cells, and the filopodia induced proteins could regulate survival, proliferation, and migration of carcinoma cells.

However, detection of filopodia may be difficult, as filopodia is rarely realized by electrical, optical, and mechanical biosensors. Firstly, filopodia are a part of the cell membrane and hard to be detected separately. Second, filopodia are thin protrusions with 200-400 nm wide and 5-30 μm length, which are hard to be detected by low sensitivity sensors.

To address at least some of these issues, according to a preferred embodiment of the present invention, there is provided a 3D nanoplasmonic biosensor with microposts to separate and detect filopodia with high sensitivity, which may be used to analyze MC3T3 osteoblast cells.

Preferably, the microposts may be further provided with proper chemical coating and dimensions so as to separate filopodia from cell membrane and allow the filopodia to extend onto the detection area of 3D nanoplasmonic biosensor. The 3D nanoplasmonic biosensor may generate Fano resonance with high sensitivity and figure of merit to detect filopodia from MC3T3 osteoblast cells.

With reference to FIG. 1, there is shown an embodiment of a biosensor 100, comprising: an array of plasmonic structures 102 arranged on a base 104, and defining a detection surface 106 distanced from the base 104; and a separator 108 arranged to separate at least a main portion 110M of a cell 110 from the detection surface 106; wherein the biosensor 100 is arranged to detect, based on a change of an optical property of the array of plasmonic structures 102, in response to one or more protrusions 110P extending from the main portion 110M of the cell 110 reaching the detection surface 106.

In this embodiment, the biosensor 100 is designed to operate based on surface plasmonic resonance. During an operation of the biosensor 100, an optical property, such as an effective refractive index, of the array of plasmonic structures 106, may be altered by applying a testing sample onto the surface of the biosensor 100. Accordingly, a level of change in such an optical property may indicate a concentration of one or more target substances in the testing sample which are in contact with the plasmonic structures, or within a detection area/range defined by the plasmonic structures.

Referring to FIG. 1, the biosensor 100 has an array of plasmonic structures 102, which is formed on a flat surface of a substrate 104, such as a silicon substrate. Each of these plasmonic structures 102 is preferably nanosized (i.e. having a feature size smaller than 1000 nm), and arranged with a pitch matching with a wavelength in a light spectrum. For example, the size of these plasmonic structures 102 may be in the range of 50-500 nm, and the pitch of the array may be 100-600 nm corresponding to the visible to infrared wavelength. As appreciated by a skilled person in the art, these dimensions may be modified based on different designs of the biosensor.

The plasmonic structures 102 include an asymmetrical pillar structure. Referring to the figure, each of these pillars includes a narrower top and a wider base, a sloped side wall and a substantially straight sidewall on the opposite side. In one exemplary embodiment, the dimensions of each of these pillars is defined with 200 nm on the top, 280 nm on the bottom, 360 nm depth and a 64° slope or inclination on the sloped sidewall.

Preferably, the array of plasmonic structures 102 includes a polymeric material, such as but not limited to SU-8. SU-8 is a polymer which may be patterned (and cured) using different techniques including optical lithography, imprinting and/or reverse imprinting, therefore allowing nanostructures to be fabricated using SU-8 polymer. Alternatively, other types of polymer such as PDMS, polyimide and PMMA may be used.

In addition, the biosensor 100 further comprises a layer of metal (not shown) covering the top and part of the sloped sidewall of the asymmetrical pillar structures 102 and the base 104 (or the substrate). For example, chromium/gold bi-layer metal (of the thickness of 2/50 nm) may be deposited on the pillar array, in which chromium is included to enhance the adhesion of the topmost gold metal layer.

During an operation of the biosensor, a light source may be used to generate an indecent light to the biosensor 100, and an optical sensor may be used to obtain the reflected light so as to observe a surface plasmonic resonance (SPR) of the biosensor 100. In general, a peak shift in the resonance wavelength may indicate that the plasmonic structures 102 are proximate to or in contact with other substance, e.g. the protrusions 110P of a cell 110 in the preferred embodiments of the present invention.

In an SPR sensor, the detection surface may be defined as a certain depth or distance from the base of the plasmonic structure array. For example, in the biosensor 100 in FIG. 1, the detection surface 106 is defined as the depth of the pillar structures 102 added with an additional height above the top of each of these pillars. Preferably, the detection surface 160 is at 0-100 nm above the top of the array of plasmonic structure, and the effective detection range may extend to certain depth, e.g. at about 0-600 nm above the base of the plasmonic structure (assuming the nanoplasmonic structures range from 50-500 nm), based on the coverage of the chromium/gold bi-layer metal which covers the top and a part of the sloped sidewall of the pillar array. The detection surface (range) may be determined by a decay of effective detection associated with a distance away from the metal coverage.

As SPR of the biosensor 100 will be altered by every parts of the cell 110 reaching the detection surface 106 defined by the plasmonic structures 102, it is preferable to prevent the main portion 110M of the cell 110 approaching the pillar structures 102, or to allow only the protrusions 110P, i.e. the filopodia extending from the main portion 110M of the cell 110, falling into the detection range closed to the pillar structures 102 and to be detected. Referring to FIG. 1, the main portion 110M includes the cytoplasm and the nucleus of the cell which are surrounded by the cell membrane, this main portion 110M rests on the top of a separator 108, and is prevented from reaching the pillar structures 102.

Preferably, the separator comprises an array of posts 112 adjacent to the array of plasmonic structures 102, and the posts 112 define the top surface 114 separated from the detection surface 106 with a distance approximated to a depth of the posts 112. In addition, the array of posts 112 also defines a plurality of gaps, which allows the protrusions 110P to pass through, and to reach the detection surface 106 close to the bottom or the base 104.

Preferably, the array of posts 112 includes a feature size larger than or equals to 2000 nm, including a depth which is sufficient to separate the main portion 110M of the cell from the pillars 102 or the detection surface 106. For example, the posts 112 may include a 5 μm depth which can effectively separate the main portion 110M of the cell 110 resting at the top surface 114 from the detection surface 106 with a distance approximated to a depth of the posts (i.e. 4.9 μm) based on the calculation that the detection surface 106 is defined at 100 nm above the top of the pillars 102. In such an arrangement, the cell membrane is way beyond the detection range of the nanoplasmonic biosensor and therefore will not affect the resonance of the biosensor 100.

Figure 2B:
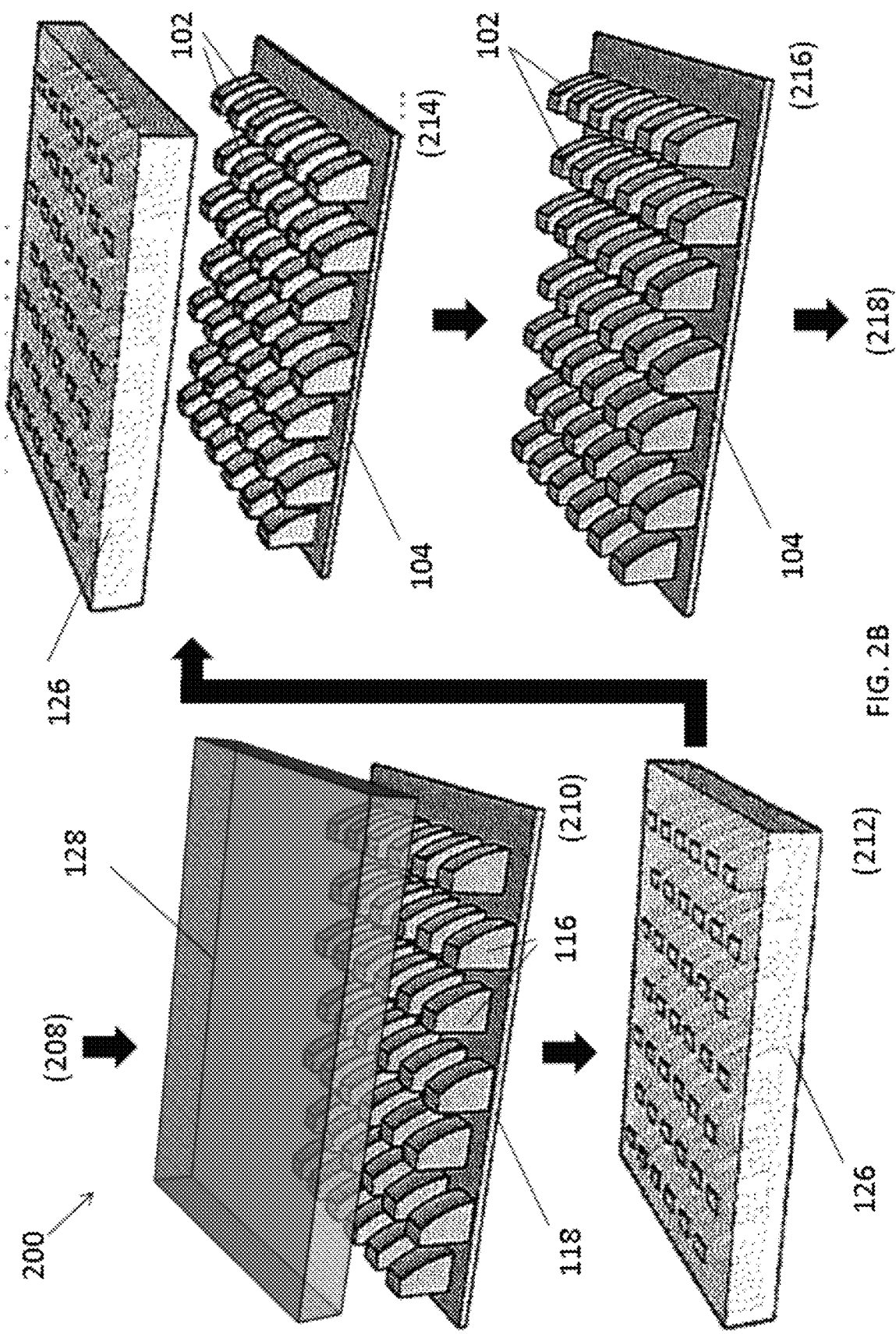
Figure 2C:
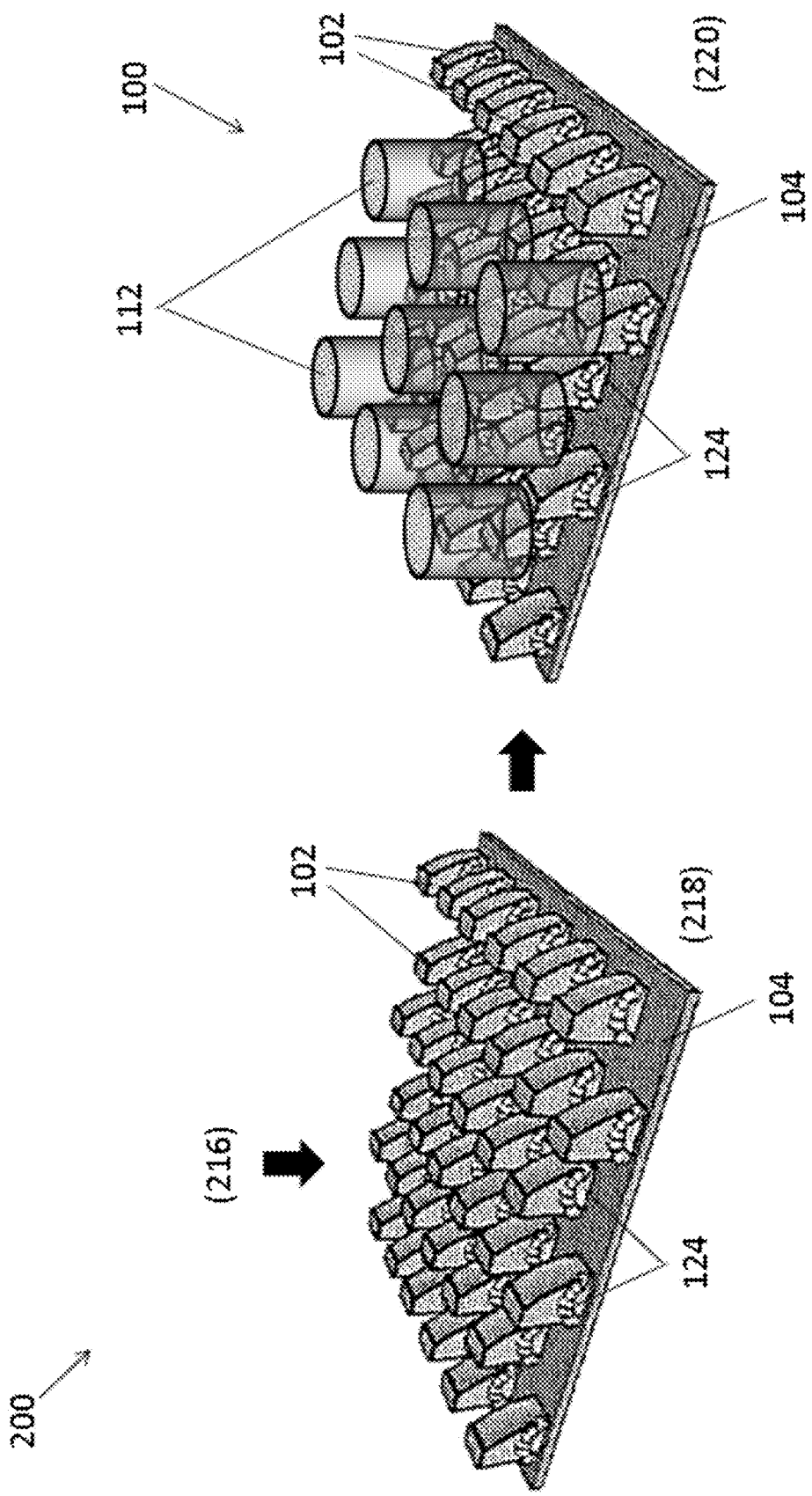

With reference to FIGS. 2A to 2C, there is shown an example process flow of the fabrication of the biosensor 100. The fabrication method 200 comprises the steps of: fabricating a first array of pillar structure on a stamp substrate; transferring the profile of the first array of pillar structure to an intermediate stamp; and forming a second array of pillar structures substantially replicating the profile of the first array of pillar structure on a final substrate using the intermediate stamp; and providing a separator arranged to separate at least a main portion of a cell from the detection surface.

Referring to FIG. 2A, the process 200 starts with fabricating the array of asymmetrical pillars 116 on a stamp substrate 118, such as silicon substrate. At step 202, a layer of SU-8 polymer 120 may be deposited on the silicon substrate 118 after standard cleaning. At step 204, an etch mask, including an array of etch masking pillar structures 122 may be formed on the stamp substrate 118 using imprinting, and by demolding from the substrate 118 at an angle, the etch masking pillar structures 122 may be defined with an inclination with respect to the surface of the silicon substrate 118.

An example imprinting process to develop the etch masking pillar structures 122 is as follows. The imprinting process may be carried out at 90° C. and applying an imprinting pressure of 40 bar, followed by 365 nm UV exposure for 60 s. As appreciated by a skilled person in the art, one or more of these process parameters may be modified so as to optimize the shape and profile of the pillar structures.

Optionally, the SU-8 residual layer on the silicon substrate 118 may be removed by $O_2$ plasma treatment of 20 sccm, 10 mTorr, 100 W RF, for 10 s. $O_2$ plasma treatment may also be combined in the subsequent etching process using similar process parameter in a reactive ion etching (RIE) etcher before etching silicon.

Preferably, the step of fabricating the first array of pillar structure 116 on the stamp substrate 118 further comprises the steps of etching the stamp substrate 118 to form the first array of pillar structure 116 each defined with a sloped sidewall. At step 206, the silicon substrate 118 with the etch mask 122 may be etched using dry etching, such as RIE or deep RIE etcher. For example, the silicon substrate may be etched with 37/70 sccm $SF_6/C_4F_8$, 10 mTorr, 600 W coil power, and 10 W platen power for 90 s. At step 208, the SU-8 etch mask 122 may be removed to obtain the silicon stamp 118 formed with a first array of pillar structure 116 or the array of asymmetrical pillar structure in accordance with embodiments of the present invention.

Referring to FIG. 2B, the pillar structures 116 on the silicon stamp 118 may be further transferred to another substrate 104, preferably by using an intermediate polymer stamp (IPS) 126. At step 210, an IPS 126 may be fabricated by thermal imprinting the silicon stamp 118 on a layer of polymer 128, at 150° C. and 40 bar for 120 s. Optionally, the surface energy is reduced to 25 mN/m by treating the silicon stamp 118 with trichloro(1H, 1H, 2H, 2H-perfluorooctyl) silane or 3-methacryloxypropyl trichlorosilane or mixture of silanes (based on desired resultant surface energy) to improve the release of the stamp 118 after the imprinting process.

The IPS 126 may be obtained after demolding the silicon stamp 118 from the IPS polymer layer 128 at step 212, in which the profile of the first array of pillar structure 116 may be transferred to the IPS 126, and the fabricated IPS 126 may be used for fabricating asymmetric pillar structures 102 on a final substrate 104. At step 214, a second array of SU-8 pillar structures 102, substantially replicating the profile of the first array of pillar structure 116 on a final silicon substrate 104, may be formed by imprinting the SU-8 layer deposited on the final silicon substrate 104. After demolding the IPS 126 from the final silicon substrate 104, at step 216, the array of plasmonic structures 102 is formed on the silicon substrate 104 which defines the base of these pillars.

Alternatively, the second array of pillar structures 102 may be fabricated using other types of polymer, such as but not limited to PDMS, polyimide, or PMMA.

Referring to FIG. 2C, at step 218, the fabrication process further includes depositing a layer of metal 124, such as 2/50 nm Cr/Au, covering the top and part of the sloped sidewall of the SU-8 asymmetrical pillar structures 102 and the base 104.

Figure 3B:
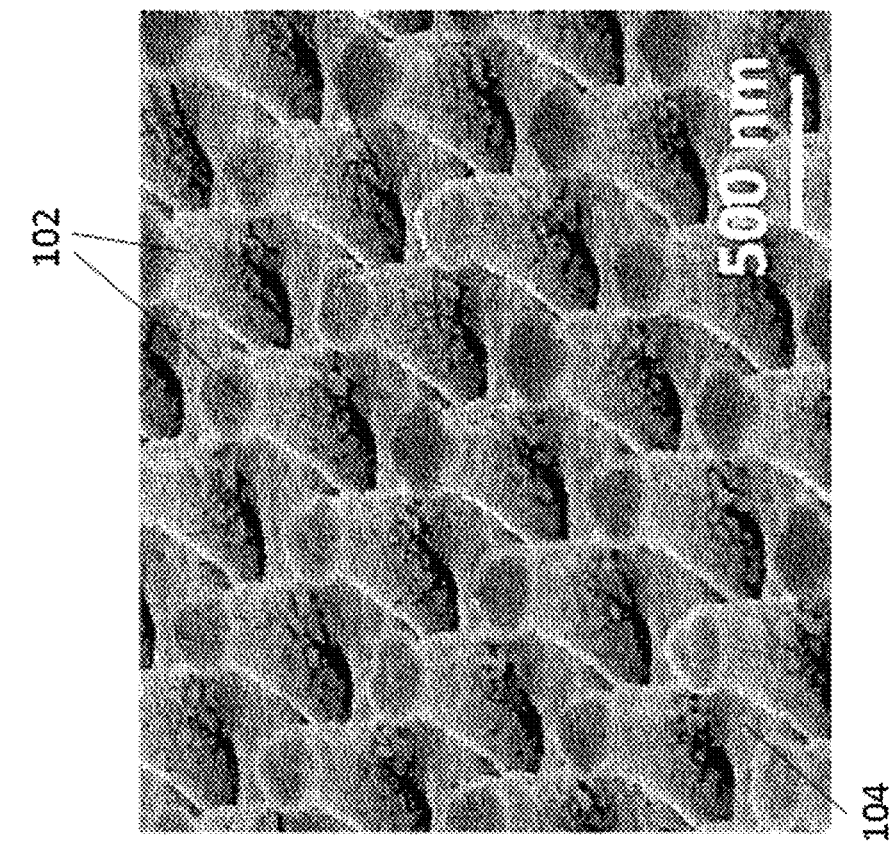
FIGS. 3A and 3B are micrographs showing a top view and a side view of an array of asymmetric pillar structures of the biosensor of FIG. 1.
Figure 3A:
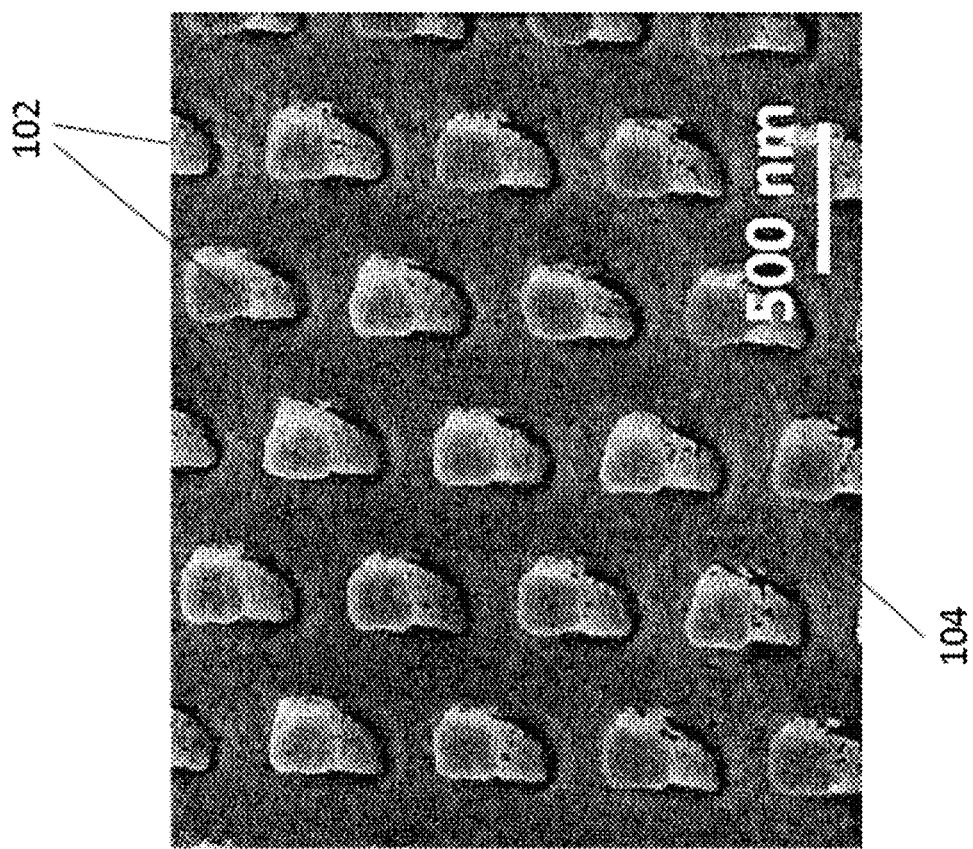
Figure 4B:
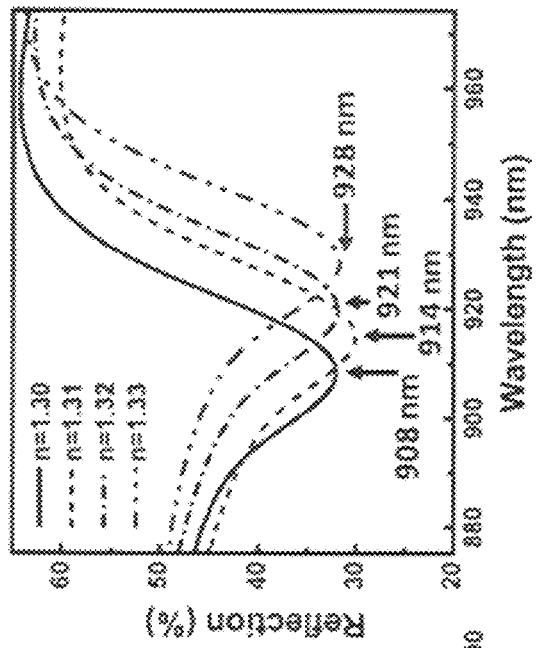
FIGS. 4A and 4B are plots showing reflection spectra of 3D asymmetrical nanopillars with sloped sidewalls at different refractive index surroundings.
Figure 4A:
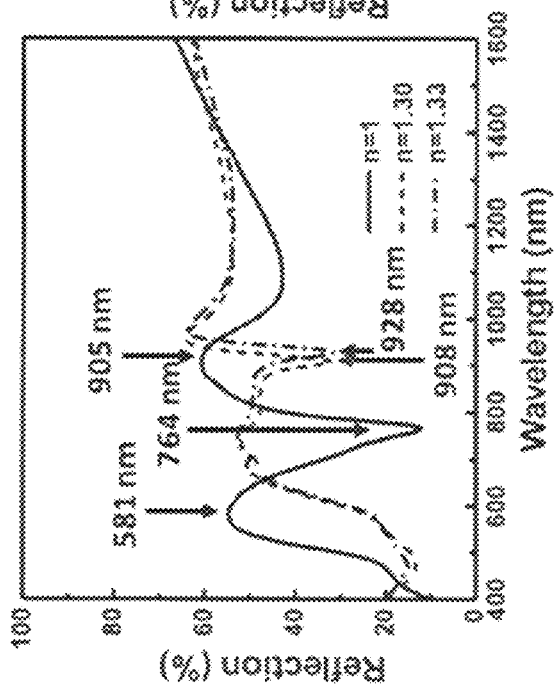
Figure 4C:
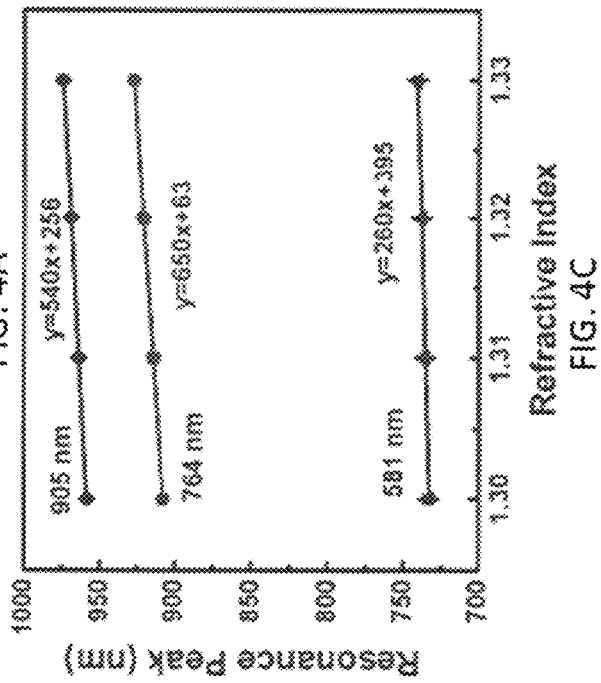
FIG. 4C is a plot showing resonance peak position as function of refractive index for 3D asymmetrical nanopillars with sloped sidewalls.

With reference also to FIGS. 3A and 3B, images of the plasmonic structures with the coated metal layer are shown. Referring to FIGS. 4A to 4C, the reflection spectra of 3D nanoplasmonic biosensor showed resonance peak/valley at 581, 764, and 905 nm, and a sharp Fano type resonance valley at 764 nm with high sensitivity of 650 nm/refractive index unit and figure of merit of 28.3 may be observed.

Finally, at step 220, the fabrication process of the biosensor is completed, by providing a separator 108 arranged to separate at least a main portion 110M of a cell from the detection surface 106. In one example process, the separator 108 includes depositing and patterning a layer of polymer to form an array of posts 112 adjacent to the array of plasmonic structures 102. Since the feature size of the array of posts 112 is relative larger, e.g. larger than or equal to 2 μm, patterning the array of posts 112 may be relatively easier than the plasmonic structures 102 on the base 104.

Figure 5:
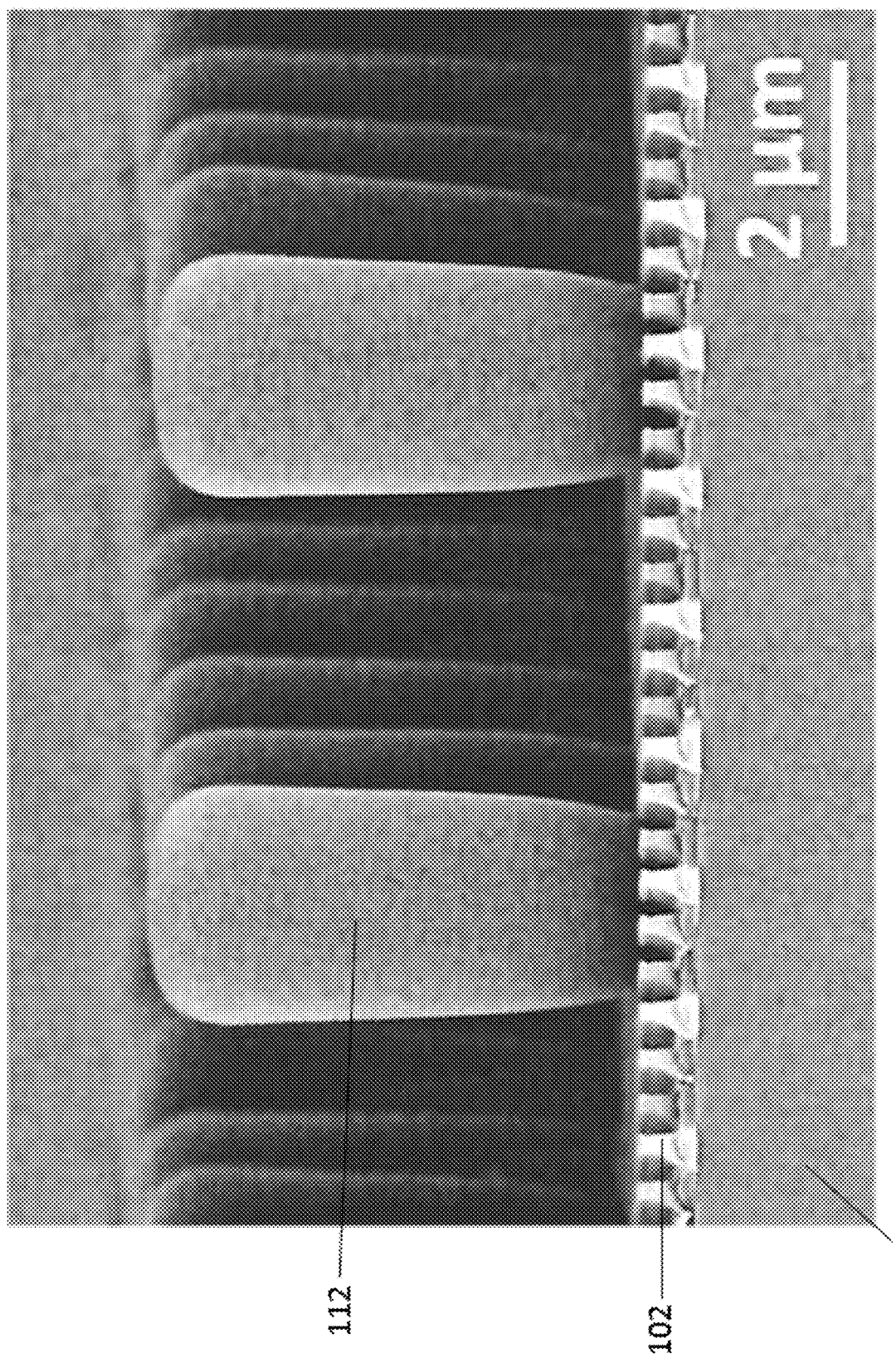
FIG. 5 is a micrograph showing a side view of microposts formed on plasmonic nanopillars with sloped sidewalls.

For example, the microposts 112 may be fabricated by patterning a layer of SU-8 on top of 3D nanoplasmonic biosensor using optical lithography. The 3D nanoplasmonic nanostructures with Au on top, bottom, and sidewalls may be first treated with 02 plasma with 20 sccm $O_2$, in 100 W RF power for 35 s. After 02 plasma treatment, SU-8 2005 photoresist may be coated on top of the 3D nanoplasmonic nanostructures at 3000 rpm for 60 s and prebaked at 65° C. and 95° C. for 2 and 3 min, respectively. The SU-8 microposts may then be patterned by optical lithography for 7 s. After post baked at 95° C. for 5 minutes, the SU-8 microposts may be developed in SU-8 developer for 40 s, followed by another hard baking process at 150° C. for 10 minutes to enhance adhesion and mechanical properties of SU-8 microposts 112. Referring to FIG. 5, there is shown a side view of the biosensor including the plasmonic structures 102 and the SU-8 microposts 112 on top of the plasmonic structures 102.

Figure 6:
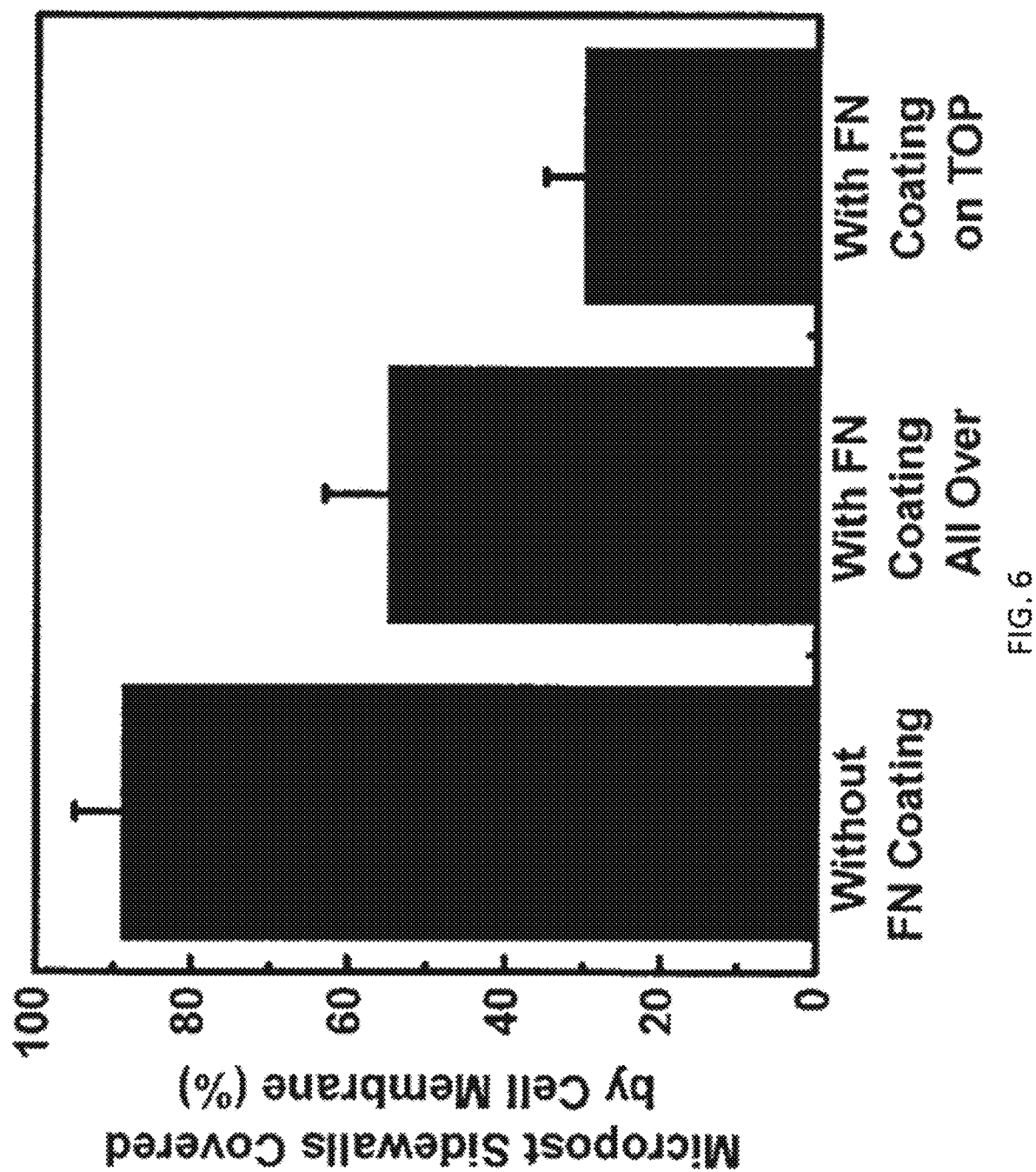
FIG. 6 is a graph showing the coverage of cell membrane on the top surface with or without FN coating on the microposts.

Optionally, an additional cell adhesion coating, such as fibronectin (FN) or collagen, may be used to cover at least a portion of the posts 112 with cell adhesion coating to facilitate the binding of the main portion 110M of the cell on the top surface 114. Preferably, only the top of each of the posts 112 is coated with the FN coating to separate the filopodia 110P from cell membrane. With reference to FIG. 6, it may be observable that the cell membrane covered 88% of microposts and both the cell membrane and filopodia could reach the detection area of nanoplasmonic biosensor without FN coating on the post. In contrast, with the FN coating all the post or only on top of microposts, the cell membrane coverage may be reduced to respectively 55% and 30% of microposts and only filopodia may extend onto the surface area of nanoplasmonic biosensor for detection.

Figure 7E:
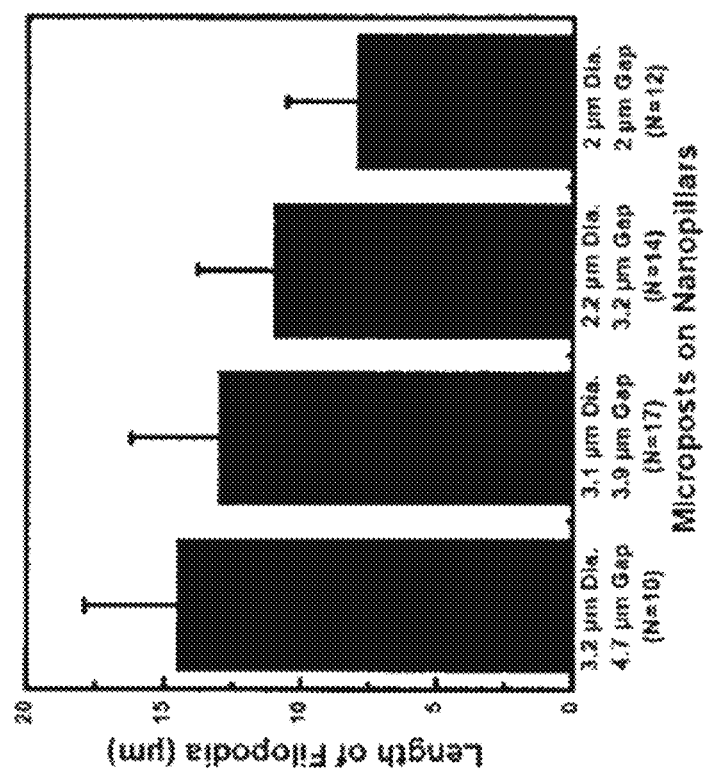
FIGS. 7D and 7E are graphs showing respectively number and length of the filopodia of the cells on the biosensor.
Figure 7D:
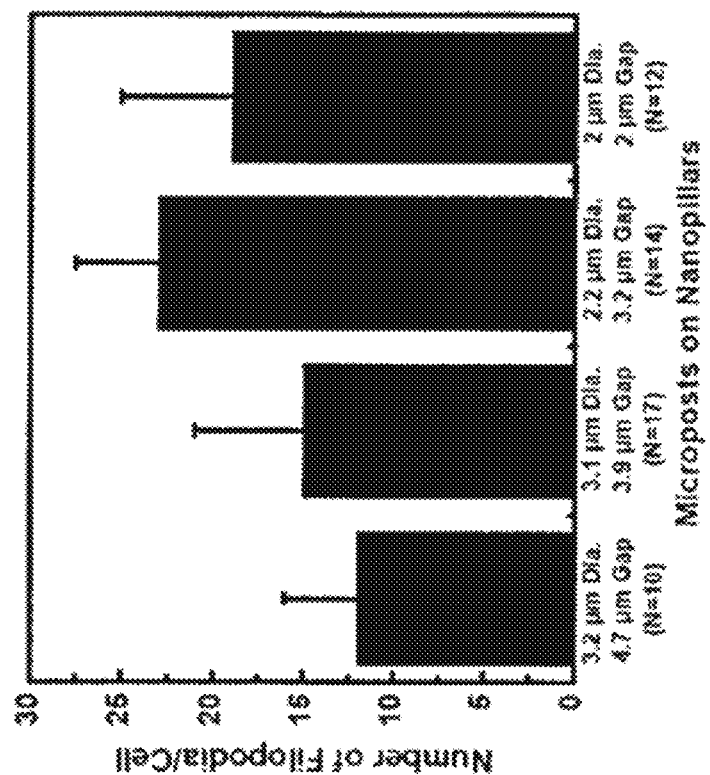

With reference to FIGS. 7A to 7C, it is also observable that the cell membrane coverage and/or the extensions of the protrusions may be altered by including different arrangements of the array of the microposts. Preferably, microposts with 2.2 μm diameter and 3.2 μm gap showed the highest number of filopodia/cell. In addition, as the density of microposts increased from 3.2 μm diameter and 4.7 μm gap to 2 μm diameter and 2 μm gap, the length of filopodia decreased from 15 to 8 μm because the smaller gap size restricts the extension of filopodia between microposts. These results are further summarized in the graphs as shown in FIGS. 7D and 7E.

With reference to FIGS. 8A to 8F, there is shown example operation of biosensor, in particular the separation of the main portion of an osteoblast cell rest on the top of the micropost with the filopodia reaching the asymmetric pillar structures underneath.

Figure 8A:
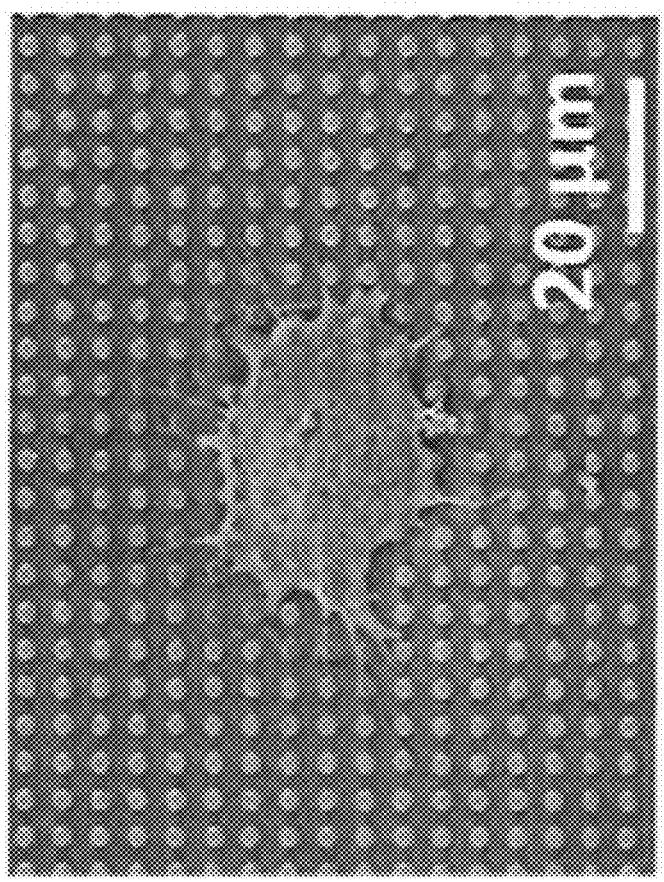
FIGS. 8A to 8C are micrographs showing top views of MC3T3 cells resting on the micropost array with different cell concentrations.
Figure 8D:
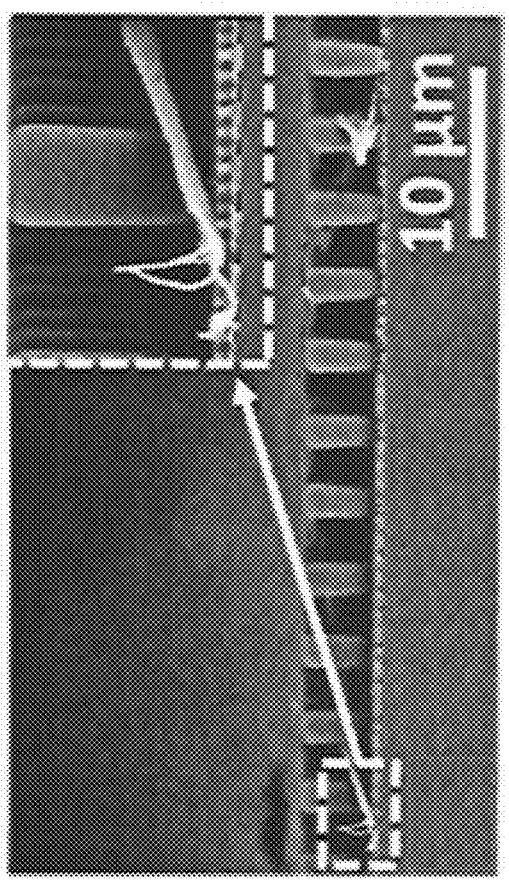
FIGS. 8D to 8F are micrographs showing side views of MC3T3 cells resting on the micropost array with different cell concentrations, corresponding to FIGS. 8A to 8C respectively.
Figure 8B:
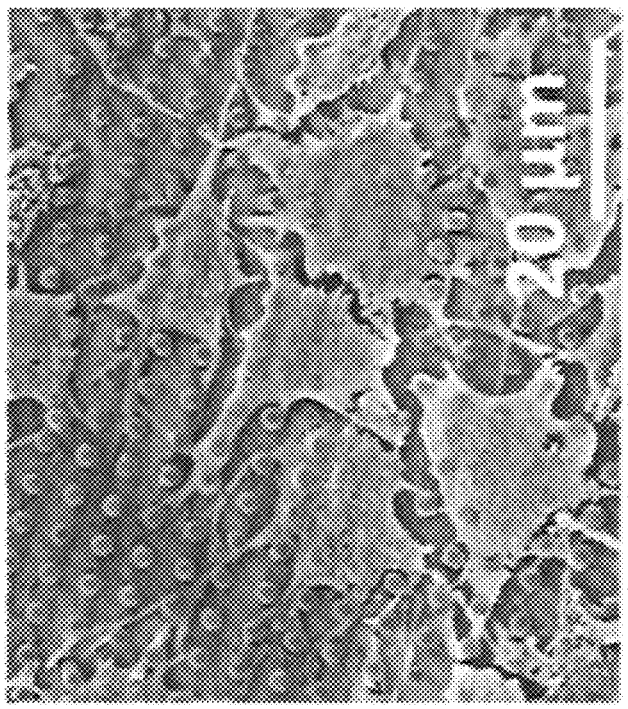
Figure 8C:
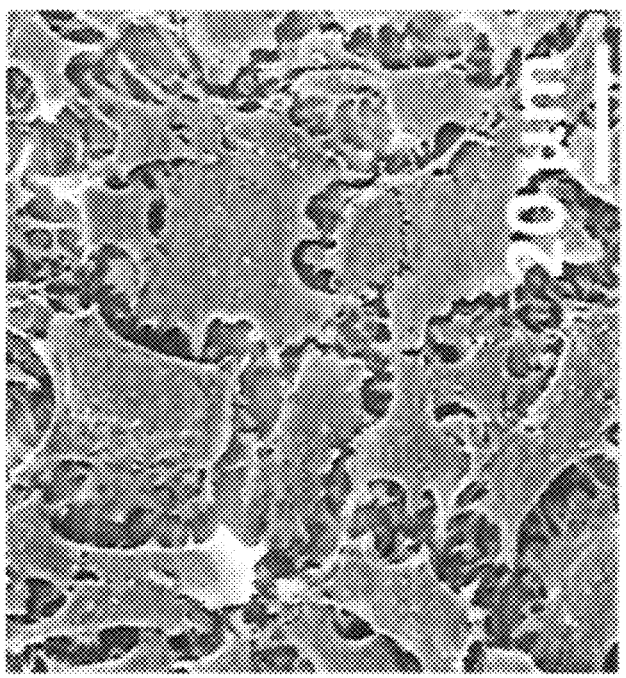
Figure 8E:
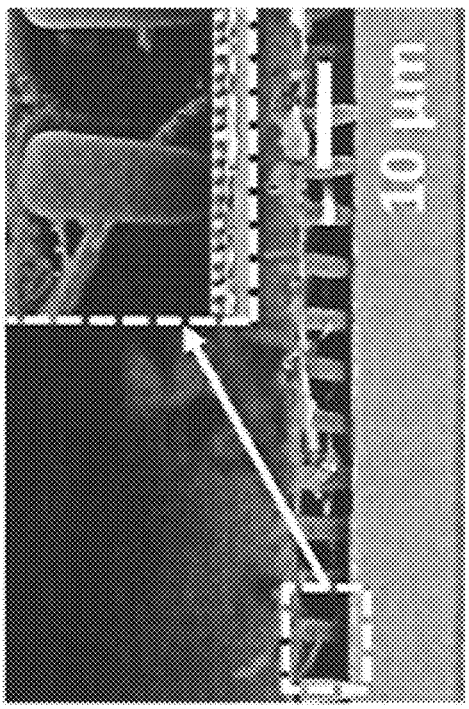
Figure 8F:
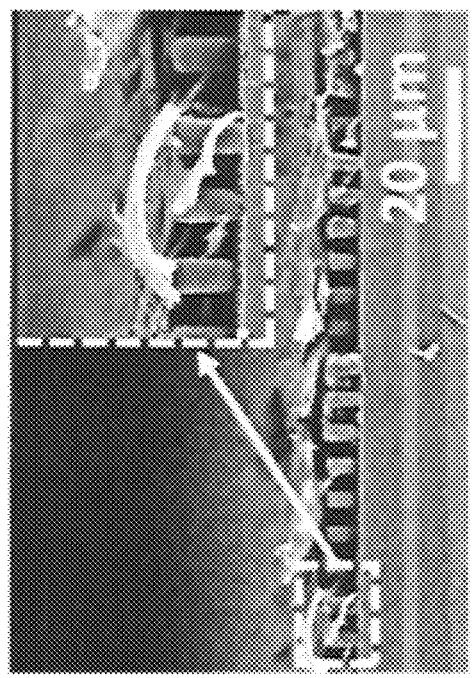

FIGS. 8A to 8C show the micrographs of the top view of MC3T3 cells on 3D microposts and nanoplasmonic biosensor with different cell concentrations, including 50, 586 and 1423 cell/mm$^2$ respectively, whereas FIGS. 8D to 8F show the respective side views. It is observable that cell membrane spreads on top of microposts, and only filopodia may reach the detection surface of nanoplasmonic biosensor for detection.

Figure 9A:
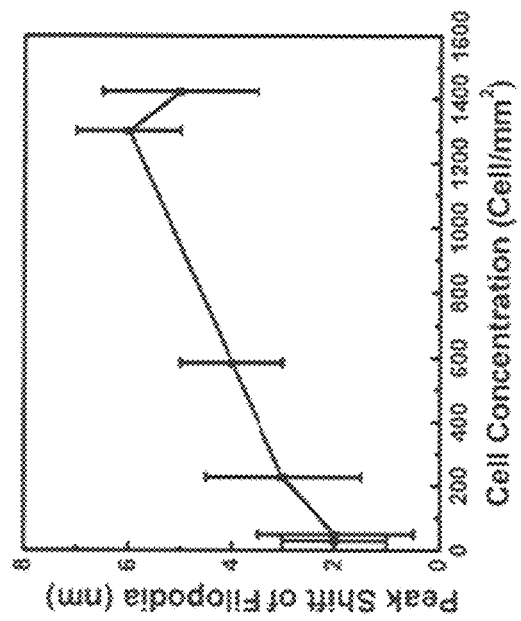
FIG. 9A is a plot showing normalized reflection spectra from 3D nanoplasmonic sensors with microposts at different cell concentrations.
Figure 9B:
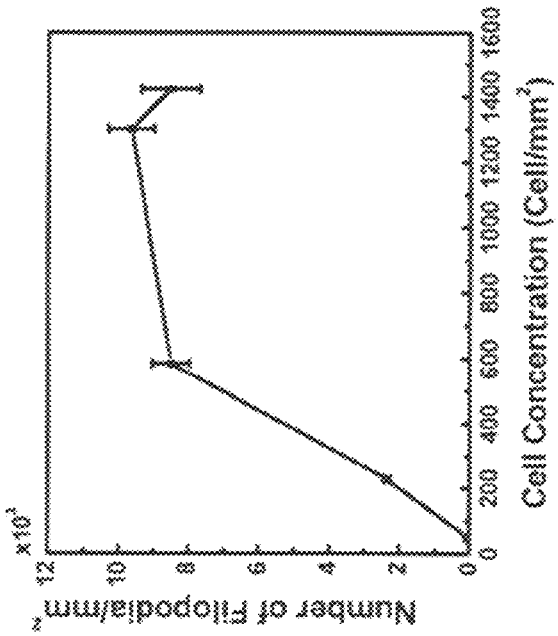
FIG. 9B is a plot showing resonance peak shift due to filopodia extensions with different cell concentrations.

With reference to FIGS. 9A and 9B, the resonance peak shifts due to the filopodia outgrowth at cell concentration of 50, 586, and 1300 cell/mm$^2$ were 2, 4 and 6 nm, respectively.

Figure 9C:
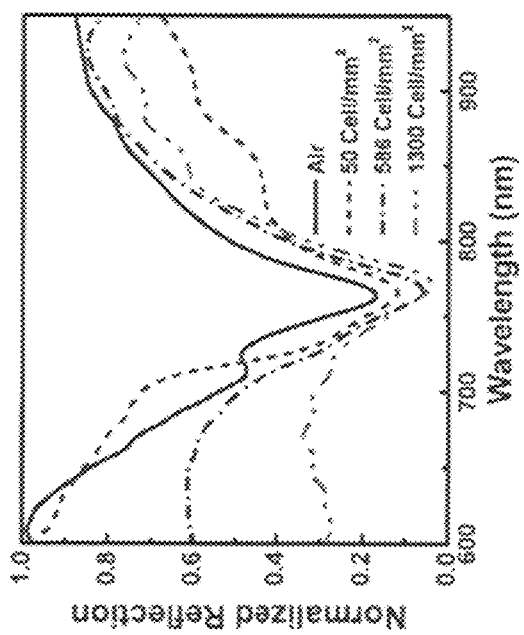
FIG. 9C is a plot showing surface area of filopodia on 3D nanoplasmonic biosensors with microposts at different concentrations.
Figure 9D:
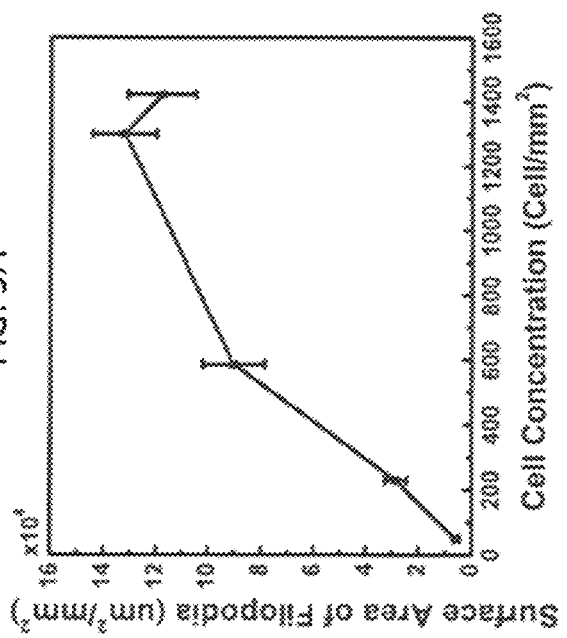
FIG. 9D is a plot showing number of filopodia on 3D nanoplasmonic biosensors with microposts at different concentrations.

With reference to FIGS. 9C and 9D, the largest surface area and number of filopodia were 13 μm²/mm² and 9/mm² respectively, for cell concentration at 1300 cell/mm².

These embodiments may be advantageous in that the 3D plasmonic biosensor with special asymmetrical pillar plasmonic structures and micropost array can be used to separate filopodia from cell membrane so as to accurately detect the amount of cell protrusions associated with surface area and number of filopodia based on peak shifts of nanoplasmonic biosensor.

With the 3D plasmonic biosensor in accordance with embodiments of the present invention, the detection method involved is fast and low cost compared to conventional filopodia detection approaches which may only be realized using super resolution microscopies.

Advantageously, the biosensor may be used in clinical application such as for distinguishing the MC3T3 osteoblast cells from normal cells as the MC3T3 osteoblast cells extend higher density of filopodia, which is useful in cancer diagnostic because filopodia is found to be important in cell adhesion, migration, and cell to cell communication.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A biosensor, comprising:
   an array of plasmonic structures arranged on a base, and defining a detection surface distanced from the base; and
   a separator arranged to separate at least a main portion of a cell from the detection surface;
   wherein the biosensor is arranged to detect, based on a change of an optical property of the array of plasmonic structures, in response to one or more protrusions extending from the main portion of the cell reaching the detection surface.

2. The biosensor in accordance with claim 1, wherein the protrusions include filopodia extending from the main portion of the cell.

3. The biosensor in accordance with claim 2, wherein the biosensor is arranged to determine a density of filopodia of a cell in cancer diagnostics.

4. The biosensor in accordance with claim 1, wherein each of the plasmonic structures includes an asymmetrical pillar structure formed on the base.

5. The biosensor in accordance with claim 4, wherein the asymmetrical pillar structure includes a sloped sidewall.

6. The biosensor in accordance with claim 5, further comprising a layer of metal covering the top and part of the sloped sidewall of the asymmetrical pillar structures and the base.

7. The biosensor in accordance with claim 6, wherein the layer of metal includes gold and/or chromium.

8. The biosensor in accordance with claim 5, wherein the detection surface is above a plane defined by the top of the array of plasmonic structures.

9. The biosensor in accordance with claim 8, wherein the detection surface is at 0-100 nm above the top of the array of plasmonic structures.

10. The biosensor in accordance with claim 4, wherein the array of plasmonic structures includes a feature size smaller than or equals to 1000 nm.

11. The biosensor in accordance with claim 1, wherein the separator comprises an array of posts adjacent to the array of plasmonic structures.

12. The biosensor in accordance with claim 11, wherein the array of posts includes a feature size larger than or equals to 2000 nm.

13. The biosensor in accordance with claim 11, wherein the array of posts defines a top surface separated from the detection surface with a distance approximated to a depth of the posts.

14. The biosensor in accordance with claim 13, wherein the top surface is arranged to facilitate the main portion of the cell to rest thereon, and the protrusions extending from the main portion of the cell to reach the detection surface through the gaps defined by the array of posts.

15. The biosensor in accordance with claim 14, wherein the separator further comprises a cell adhesion coating covering at least a portion of each of the posts.

16. The biosensor in accordance with claim 15, wherein only the top of each of the posts is coated with the cell adhesion coating to facilitate the binding of the main portion of the cell on the top surface.

17. The biosensor in accordance with claim 15, wherein the cell adhesion coating includes fibronectin or collagen.

18. The biosensor in accordance with claim 1, wherein the array of plasmonic structures and the separator includes SU-8, PDMS, polyimide, or PMMA polymer.

19. The biosensor in accordance with claim 1, wherein the optical property includes a refractive index of the array of plasmonic structures altered by the protrusions of the cell reaching the detection surface.

20. A method of fabricating an array of plasmonic structures, comprising the steps of:
   fabricating a first array of pillar structure on a stamp substrate;
   transferring the profile of the first array of pillar structure to an intermediate stamp; and
   forming a second array of pillar structures substantially replicating the profile of the first array of pillar structure on a final substrate using the intermediate stamp;
   wherein each of the pillar structures in the first array of pillar structure and the second array of pillar structure includes an asymmetrical pillar structure.

21. The method in accordance with claim 20, wherein the asymmetrical pillar structure includes a sloped sidewall.

22. The method in accordance with claim 21, wherein the step of fabricating the first array of pillar structure on the stamp substrate comprises the steps of:
   providing an etch mask including an array of etch masking pillar structures on the stamp substrate;
   etching the stamp substrate to form the first array of pillar structure each defined with a sloped sidewall.

23. The method in accordance with claim 22, wherein each of the etch masking pillar structures includes an inclination with respect to a surface of the stamp substrate.

24. The method in accordance with claim 23, wherein the step of providing an etch mask on the stamp substrate comprises the steps of:
   imprinting the array of etch masking pillar structures on the stamp substrate; and
   after imprinting, demolding at an angle to define the etch masking pillar structures with the inclination.

25. The method in accordance with claim 24, wherein the etch masking pillar structures include SU-8, PDMS, polyimide, or PMMA polymer.

26. The method in accordance with claim 22, wherein the stamp substrate is a silicon substrate and is etched using a dry etching.

27. A method of fabricating a biosensor, comprising the steps of:
providing an array of plasmonic structures formed on a base using the method in accordance with claim 21, wherein the array of plasmonic structures defines a detection surface distanced from the base;
providing a separator arranged to separate at least a main portion of a cell from the detection surface;
wherein the biosensor is arranged to detect, based on a change of an optical property of the array of plasmonic structures, in response to one or more protrusions extending from the main portion of the cell reaching the detection surface.

28. The method in accordance with claim 27, further comprising the step of depositing a layer of metal covering the top and part of the sloped sidewall of the asymmetrical pillar structures and the base.

29. The method in accordance with claim 28, wherein the layer of metal includes gold and/or chromium.

30. The method in accordance with claim 27, wherein the step of providing the separator comprising the step of depositing and patterning a layer of polymer to form an array of posts adjacent to the array of plasmonic structures.

31. The method in accordance with claim 30, wherein patterning a layer of polymer includes patterning a layer of SU-8, PDMS, polyimide, or PMMA using optical lithography.

32. The method in accordance with claim 30, wherein the step of providing the separator further comprising the step of coating at least a portion of the posts with cell adhesion coating to facilitate the binding of the main portion of the cell on the top surface.

33. The method in accordance with claim 32, wherein the cell adhesion coating includes fibronectin or collagen.

34. The method in accordance with claim 20, wherein the intermediate stamp includes an intermediate polymer stamp.

35. The method in accordance with claim 34, wherein the step of forming a second array of pillar structures on the final substrate comprising the step of imprinting the second array of pillar structures on the final substrate.

36. The method in accordance with claim 35, wherein the second array of pillar structures includes SU-8, PDMS, polyimide, or PMMA polymer.

37. The method in accordance with claim 20, further comprising the step of reducing a surface energy of the stamp substrate prior to the step of transferring the profile of the first array of pillar structure to an intermediate stamp.

38. The method in accordance with claim 37, wherein the surface energy is reduced by treating the stamp substrate with trichloro(1H, 1H, 2H, 2H-perfluorooctyl)silane, 3-methacryloxypropyl trichlorosilane or mixture of silanes.

* * * * *